US008814582B2

(12) United States Patent
Lee et al.

(10) Patent No.: US 8,814,582 B2
(45) Date of Patent: Aug. 26, 2014

(54) CARD CONNECTOR

(71) Applicant: Proconn Technology Co., Ltd., New Taipei (TW)

(72) Inventors: Yun Chien Lee, New Taipei (TW); Ta Chih Yu, New Taipei (TW); Chih Chiang Lin, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 112 days.

(21) Appl. No.: 13/745,443

(22) Filed: Jan. 18, 2013

(65) Prior Publication Data

US 2014/0206212 A1   Jul. 24, 2014

(51) Int. Cl.
*H01R 13/62*   (2006.01)
*H01R 13/629*   (2006.01)

(52) U.S. Cl.
CPC .................................... *H01R 13/629* (2013.01)
USPC ............................................................ 439/159

(58) Field of Classification Search
CPC .................................................... H01R 13/629
USPC ................................. 439/159, 630, 928.1, 945
See application file for complete search history.

(56) References Cited

U.S. PATENT DOCUMENTS

| | | | | |
|---|---|---|---|---|
| 5,033,972 A | * | 7/1991 | Komatsu et al. | 439/153 |
| 5,315,478 A | * | 5/1994 | Cadwell et al. | 361/679.32 |
| 5,563,400 A | * | 10/1996 | Le Roux | 235/486 |
| 5,600,539 A | * | 2/1997 | Heys et al. | 361/679.32 |
| 6,006,987 A | * | 12/1999 | Hoolhorst | 235/375 |
| 6,035,216 A | * | 3/2000 | Cheng et al. | 455/558 |
| 6,805,589 B2 | * | 10/2004 | Lee | 439/630 |
| 6,955,566 B2 | * | 10/2005 | Matsunaga et al. | 439/630 |
| 7,066,748 B2 | * | 6/2006 | Bricaud et al. | 439/159 |
| 7,081,020 B1 | * | 7/2006 | Lee | 439/630 |
| 7,112,075 B1 | * | 9/2006 | Su | 439/159 |
| 7,229,300 B2 | * | 6/2007 | Lai et al. | 439/159 |
| 7,314,390 B1 | * | 1/2008 | Lai et al. | 439/630 |
| 7,520,766 B2 | * | 4/2009 | Tsai | 439/159 |
| 7,794,232 B2 | * | 9/2010 | Ogatsu | 439/64 |
| 8,092,257 B2 | * | 1/2012 | Hubert et al. | 439/638 |
| 8,371,878 B2 | * | 2/2013 | Tang | 439/630 |
| 8,564,965 B2 | * | 10/2013 | Sloey et al. | 361/752 |
| 8,579,640 B2 | * | 11/2013 | Ho | 439/159 |
| 8,616,920 B2 | * | 12/2013 | Pauley et al. | 439/630 |
| 8,724,311 B2 | * | 5/2014 | Hsu | 361/679.4 |
| 8,725,198 B2 | * | 5/2014 | Wang et al. | 455/550.1 |
| 8,734,188 B2 | * | 5/2014 | Nakase et al. | 439/630 |

\* cited by examiner

*Primary Examiner* — Neil Abrams
(74) *Attorney, Agent, or Firm* — WPAT, P.C.; Anthony King

(57) ABSTRACT

A card connector includes an insulating housing, a plurality of conductive terminals integrally molded with the insulating housing, an ejection mechanism, a handle lever, and a shielding shell covered on the insulating housing. The insulating housing has a bottom wall which defines a sliding groove. The ejection mechanism includes a sliding block slidably disposed to the sliding groove of the insulating housing, an elastic element and a guide pin. The sliding block has a base body, and an extending portion extending forward from the base body. The handle lever slidably disposed to the insulating housing and the sliding block has a base board, a first sliding rail and a second sliding rail. The first sliding rail is slidably disposed to the other side of the insulating housing adjacent to the first side wall, and the second sliding rail is slidably mounted to the extending portion of the sliding block.

14 Claims, 7 Drawing Sheets

CARD CONNECTOR

BACKGROUND OF THE INVENTION

1. Field of the Invention

The present invention generally relates to a card connector, and more particularly to a card connector adapted for being communicated between a card and a circuit board of a communication device.

2. The Related Art

Nowadays, communication devices, such as cell phones, play an important role in people's daily life. In order to realize a basic function of the communication device, a card connector adapted for being communicated between a card and a circuit board of the communication device is indispensable. Generally, the card connector includes an insulating housing, a plurality of terminals, an ejection mechanism and a shielding shell. Each of the terminals has a locating arm, a contact arm connecting with a front end of the locating arm, and a soldering arm connecting with a rear end of the locating arm. The terminals are disposed to the insulating housing with the contact arms thereof being exposed beyond a bottom of the insulating housing to contact with the card and the soldering arms being exposed behind the bottom of the insulating housing to be soldered with the circuit board. The ejection mechanism is disposed to one side of the insulating housing. The shielding shell is covered on the insulating housing to define an insertion space between the shielding shell and the insulating housing for receiving the card therein. When the card is inserted into the insertion space of the card connector, push the card rearward directly to push the sliding block rearward to drive an action of the ejection mechanism so as to lock the card in the insertion space of the card connector. When the card is ejected out of the insertion space of the card connector, push the card rearward directly again to push the sliding block rearward to drive another action of the ejection mechanism so as to eject the card out of the insertion space of the card connector.

However, the card is locked in or ejected out of the insertion space of the card connector by virtue of pushing the card rearward directly to push the sliding block rearward to drive the action of the ejection mechanism that is apt to make the card inserted into the insertion space of the card connector out of place and makes the card hardly ejected out of the insertion space of the card connector, when the card has a very small size. As a result, it is inconvenient for the card to be inserted into or ejected out of the insertion space of the card connector.

SUMMARY OF THE INVENTION

An object of the present invention is to provide a card connector adapted for being communicated between a card and a circuit board of a communication device. The card connector includes an insulating housing, a plurality of conductive terminals, an ejection mechanism, a handle lever and a shielding shell. The insulating housing has a bottom wall, a first side wall and a second side wall extending upward from two opposite sides of the bottom wall, and a rear wall extending upward from a rear end of the bottom wall. One side of a top surface of the bottom wall adjacent to the second side wall is concaved downward to form a sliding groove. The conductive terminals are integrally molded with the insulating housing with contact arms defined at fronts thereof projecting beyond the top surface of the bottom wall to electrically contact with the card, and soldering arms defined at rears thereof projecting behind a rear surface of the bottom wall to be soldered with the circuit board. The ejection mechanism includes a sliding block slidably disposed to the sliding groove of the insulating housing, an elastic element clipped between the sliding block and rear wall, and a guide pin of which one end is fastened in the sliding block and the other end is slidably located in a front of the one side of the insulating housing. The sliding block has a base body, a sliding portion extending sideward from a rear end of one side surface of the base body to project on the top surface of the bottom wall for ejecting the card out, and an extending portion extending forward from one side of a front surface of the base body to be slidably located in the sliding groove. The handle lever is slidably disposed to the insulating housing and the sliding block. The handle lever has a base board, and a first sliding rail and a second sliding rail extending rearward from two opposite sides of the base board. The first sliding rail is slidably disposed to the other side of the insulating housing adjacent to the first side wall, and the second sliding rail is slidably mounted to the extending portion of the sliding block. The shielding shell is covered on the insulating housing to form an insertion space between the insulating housing and the shielding shell for receiving the card therein. The card is locked in or ejected out of the insertion space of the card connector by virtue of pushing the handle lever rearward to push the sliding block to slide rearward so as to drive an action of the ejection mechanism.

As described above, the card is locked in or ejected out of the card connector by virtue of pushing the handle lever rearward to push the sliding block to slide rearward to drive the action of the ejection mechanism so that the card is inserted into the insertion space of the card connector in place and the card is easily ejected out of the insertion space of the card connector, when the card has a very small size. As a result, it is convenient for the card to be inserted into or ejected out of the insertion space of the card connector.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
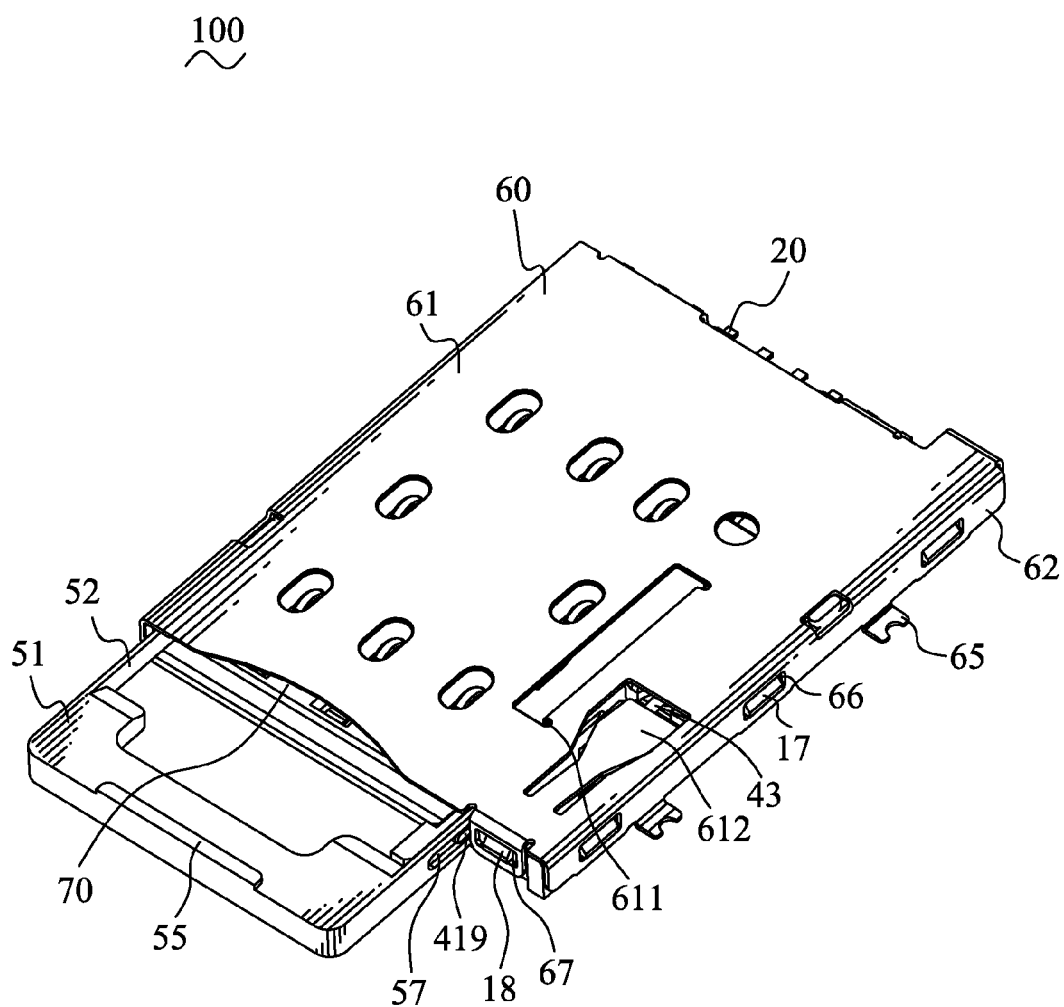
FIG. 1 is a perspective view of a card connector in accordance with an embodiment of the present invention.
Figure 2:
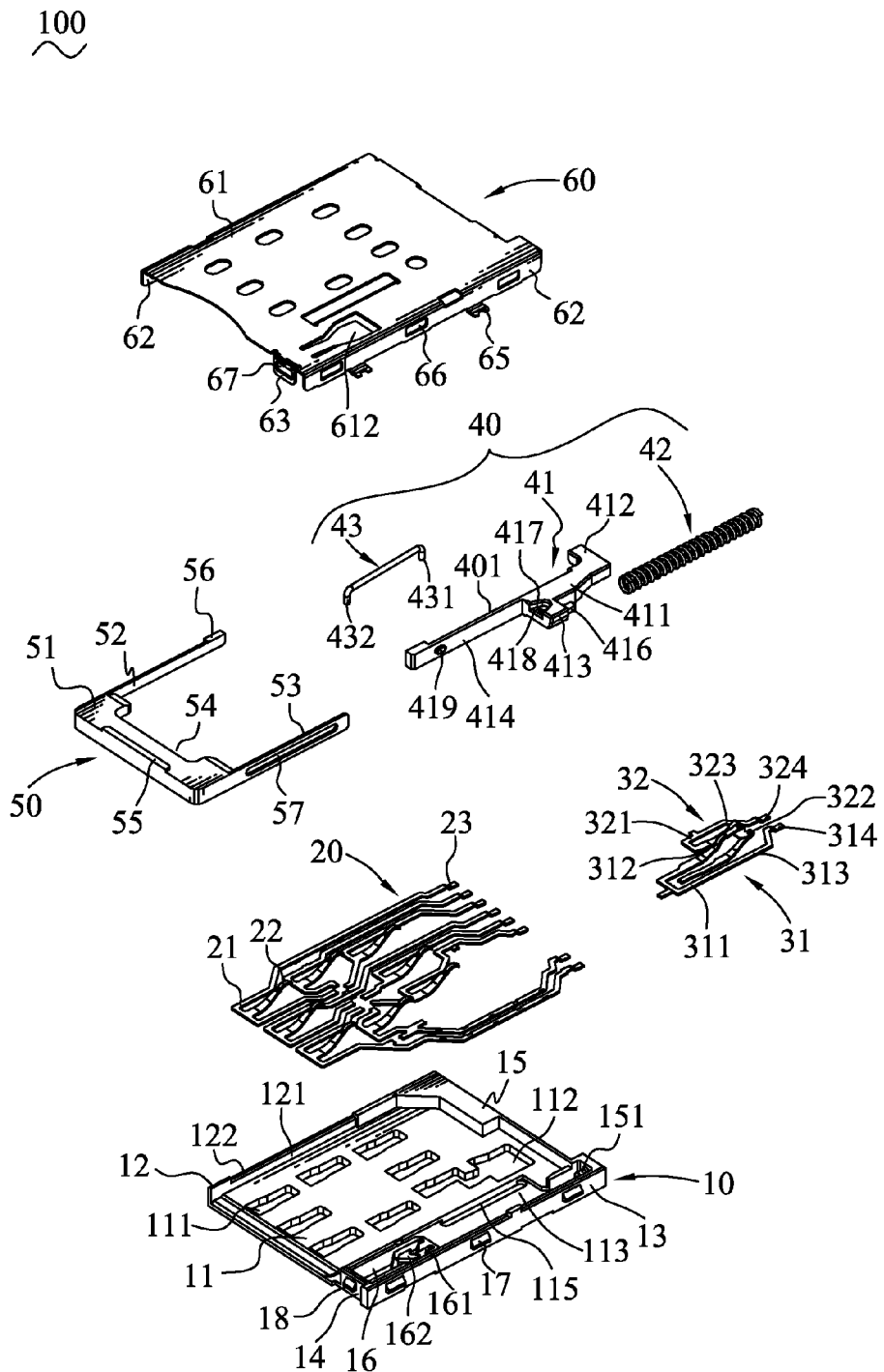
FIG. 2 is an exploded view of the card connector of FIG. 1.
Figure 7:
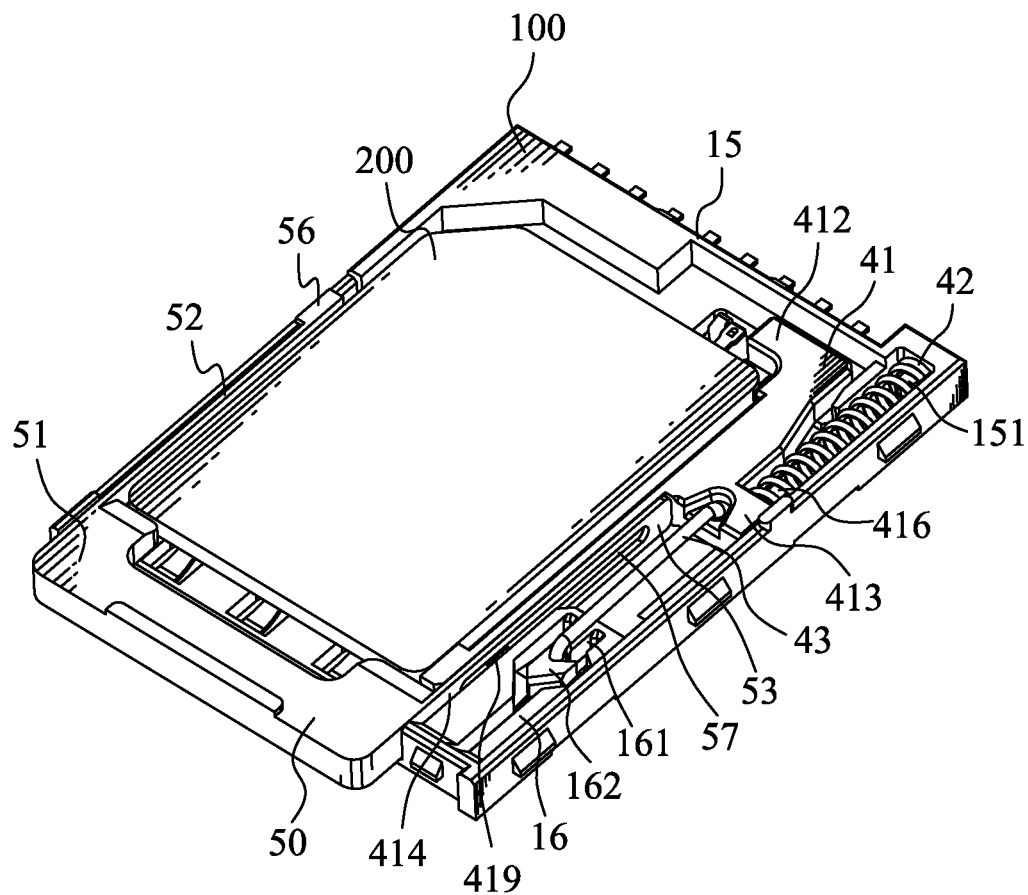
FIG. 7 is a perspective view of the card connector of FIG. 1, wherein the shielding shell is removed and the card is locked in the card connector.

With reference to FIG. 1, FIG. 2 and FIG. 7, a card connector 100 in accordance with an embodiment of the present invention is shown. The card connector 100 adapted for being communicated between a card 200 and a circuit board of a communication device (not shown) includes an insulating housing 10, a plurality of conductive terminals 20, a first switch terminal 31 and a second switch terminal 32, an ejection mechanism 40, a handle lever 50 and a shielding shell 60.

Figure 5:
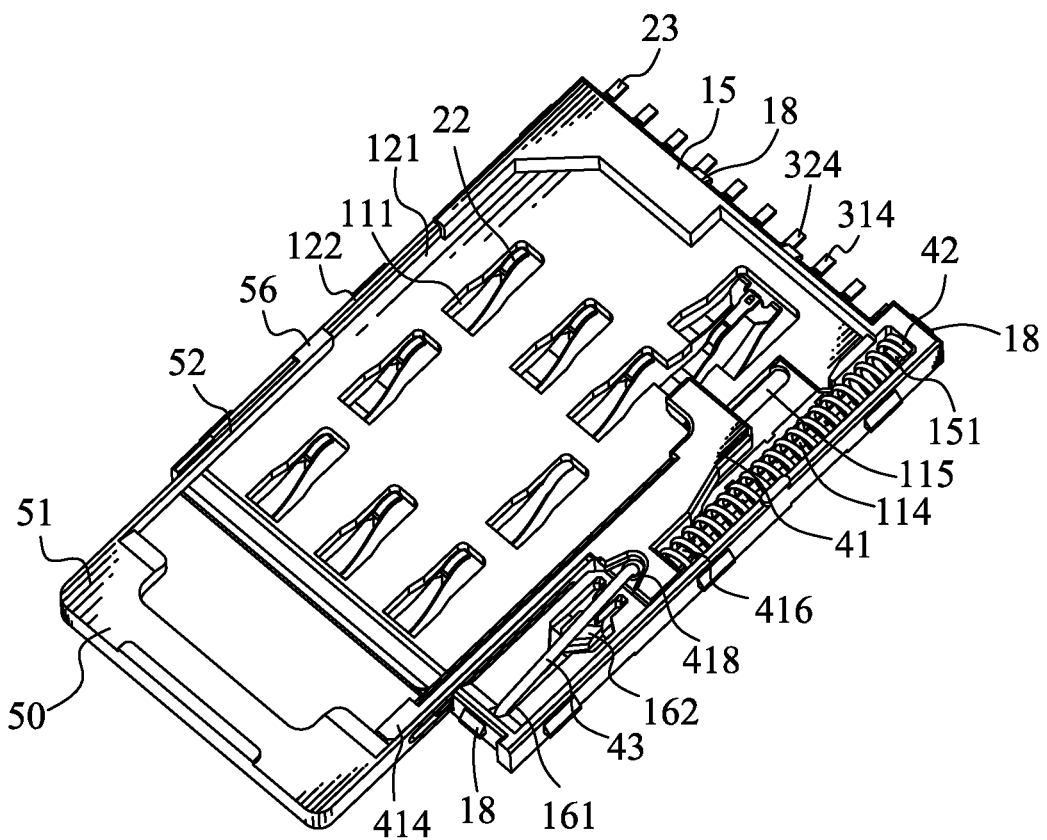
FIG. 5 is a perspective view of the card connector of FIG. 2, wherein the shielding shell is removed.
Figure 6:
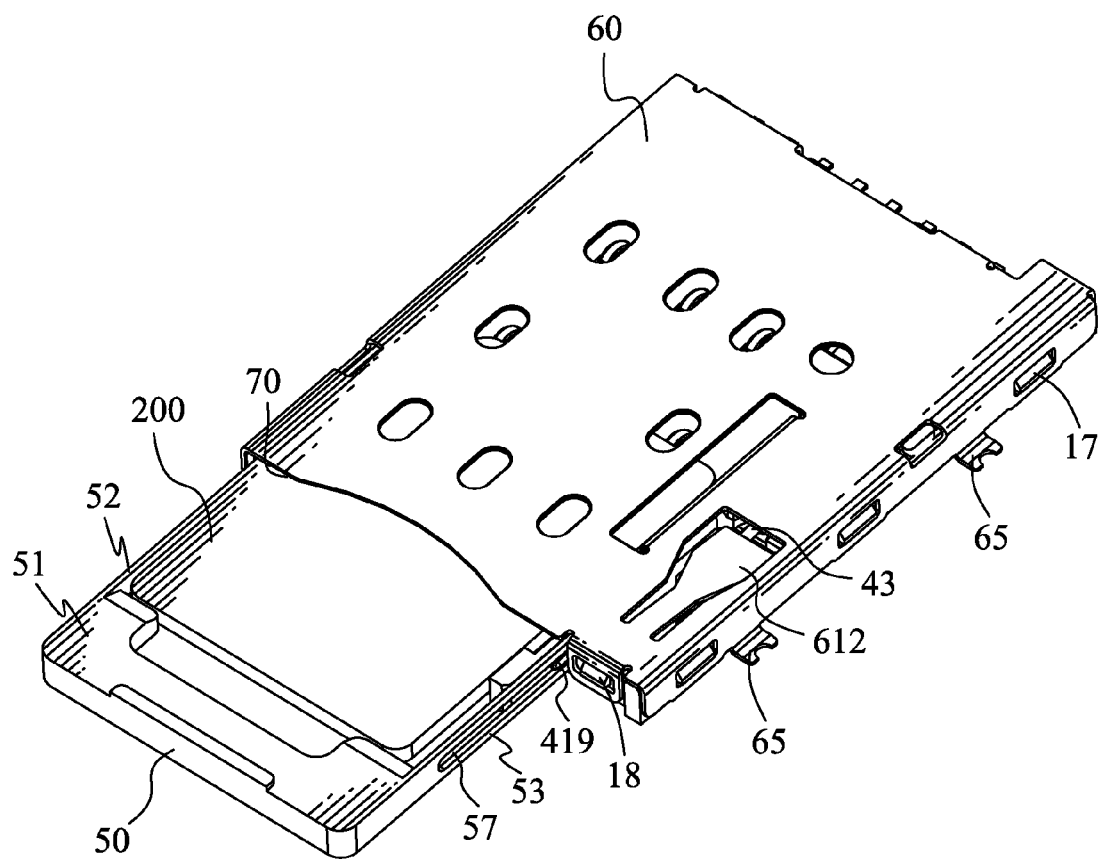
FIG. 6 is a perspective view of the card connector of FIG. 1, wherein a card is ejected out of the card connector.

Referring to FIG. 2 and FIG. 5, the insulating housing 10 has a bottom wall 11 of a substantial rectangular shape, a first side wall 12 and a second side wall 13 extending upward from two opposite sides of the bottom wall 11, a front wall 14 extending upward from one side of a front end of the bottom wall 11 and connected with the second side wall 13, and a rear wall 15 extending upward from a rear end of the bottom wall 11 and connected with the first side wall 12 and the second side wall 13. The bottom wall 11 defines a plurality of first terminal holes 111 vertically penetrating therethrough and arranged in three rows, and a second terminal hole 112 vertically penetrating therethrough and located in rear of the first terminal holes 111. One side of a top surface of the bottom wall 11 of the insulating housing 10 adjacent to the second side wall 13 is concaved downward to form a sliding groove 113. One side of a bottom sidewall of the sliding groove 111 adjacent to the second side wall 13 is concaved downward to form a receiving trough 114 extending along a front-to-rear direction between a rear surface of the front wall 14 and a front surface of the rear wall 15. A rear of the other side of the bottom sidewall of the sliding groove 113 defines a guiding slot 115 vertically penetrating therethrough. A front of the bottom sidewall of the sliding groove 113 of the insulating housing 10 protrudes upward to form a protruding block 16.

A front end of the protruding block 16 is connected with the rear surface of the front wall 14. A top of the protruding block 16 defines a heart-shaped tracking groove 161 joined end to end. A portion of a bottom sidewall of the tracking groove 161 protrudes upward to form a locking portion 162 located apart from an inside of a periphery of the tracking groove 161. An inner surface of the first side wall 12 of the insulating housing 10 defines a receiving groove 121 extending along a front-to-rear direction to penetrate through a front surface of the first side wall 12. A top of the receiving groove 121 passes through a top surface of the first side wall 12 and has a rear thereof further spread outward to form a limiting slot 122. A portion of the front surface of the rear wall 15 of the insulating housing 10 protrudes forward to form a holding pillar 151. Outer surfaces of the first side wall 12 and the second side wall 13 of the insulating housing 10 protrude outward to form a plurality of first buckling lumps 17. Outer surfaces of the front wall 14 and the rear wall 15 of the insulating housing 10 protrude outward to form a plurality of second buckling lumps 18.

Referring to FIG. 2, each of the conductive terminals 20 has a zigzag locating arm 21, a contact arm 22 slantwise extending upward and rearward, and then arched upward from a front end of the locating arm 21, and a soldering arm 23 bent downward and then extending rearward from a rear end of the locating arm 21.

Referring to FIG. 2, the first switch terminal 31 has a substantial lying U-shaped first locating portion 311 with the mouth thereof being opened rearward, a first contact portion 312 slantwise extending upward and rearward from one end of the first locating portion 311, a first connecting portion 313 extending rearward, then slantwise extending towards the one end of the first locating portion 311, and further extending rearward from the other end of the first locating portion 311, and a first soldering portion 314 bent downward, and then extending rearward from a rear end of the first connecting portion 313. The second switch terminal 32 has a substantial lying U-shaped second locating portion 321 with the mouth thereof being opened rearward, and a substantial U-shaped second contact portion 322 with the mouth thereof being opened forward. A rear end of the second contact portion 322 is inclined upward and rearward, and one side of the second contact portion 322 connects with one end of the second locating portion 321. A second connecting portion 323 extends rearward, then slantwise extends towards the one end of the second locating portion 321, and further extends rearward from the other end of the second locating portion 321. And a second soldering portion 324 is bent downward and then extends rearward from a rear end of the second connecting portion 323.

Figure 3:
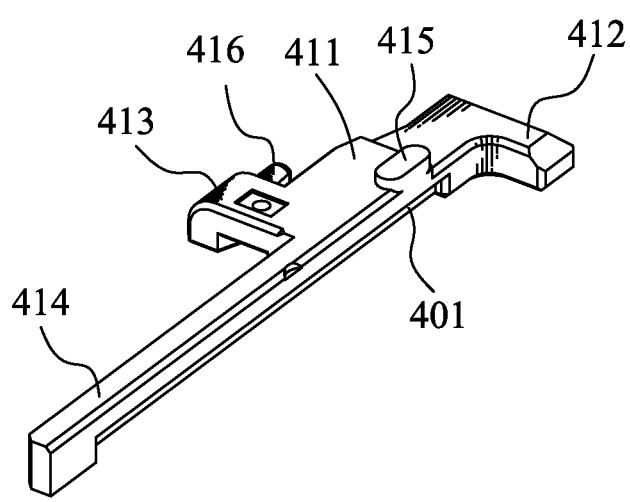
FIG. 3 is a perspective view of a sliding block of the card connector of FIG. 2.

Referring to FIG. 2 and FIG. 3, the ejection mechanism 40 includes a sliding block 41, an elastic element 42 and a guide pin 43 of an inverted-U shape which includes a fastening portion 431 at one end thereof and a sliding portion 432 at the other end thereof. The sliding block 41 has a base body 411, a sliding portion 412 extending sideward from a rear end of one side surface of the base body 411, a pushing portion 413 extending opposite to the sliding portion 412 from a front end of the other side surface of the base body 411, and an extending portion 414 extending forward from one side of a front surface of the base body 411 with one side surface thereof being flush with the one side surface of the base body 411. A bottom surface of the base body 411 protrudes downward to form a guiding block 415. A rear surface of the pushing portion 413 protrudes rearward to form a location pillar 416. The pushing portion 413 defines a fastening groove 417 penetrating through a top surface and a front surface thereof. A bottom sidewall of the fastening groove 417 defines a fastening hole 418. The sliding block 41 defines an insertion slot 401 passing through the one side surfaces and top surfaces of the base body 411 and the extending portion 414. The other side surface of the extending portion 414 protrudes outward to form a guiding pillar 419.

Referring to FIG. 2, the handle lever 50 has a rectangular base board 51, and a first sliding rail 52 and a second sliding rail 53 extending rearward from two opposite sides of the base board 51. A receiving space 54 is formed among the base board 51, the first sliding rail 52 and the second sliding rail 53. A middle of a front end of a top surface of the base board 51 protrudes upward to form an anti-skidding rib 55 with an anti-skidding function. A rear end of an outer surface of the first sliding rail 52 of the handle lever 50 protrudes outward to form a limiting block 56. A substantial middle of the second sliding rail 53 of the handle lever 50 defines a sliding slot 57 extending along the front-to-rear direction.

Figure 4:
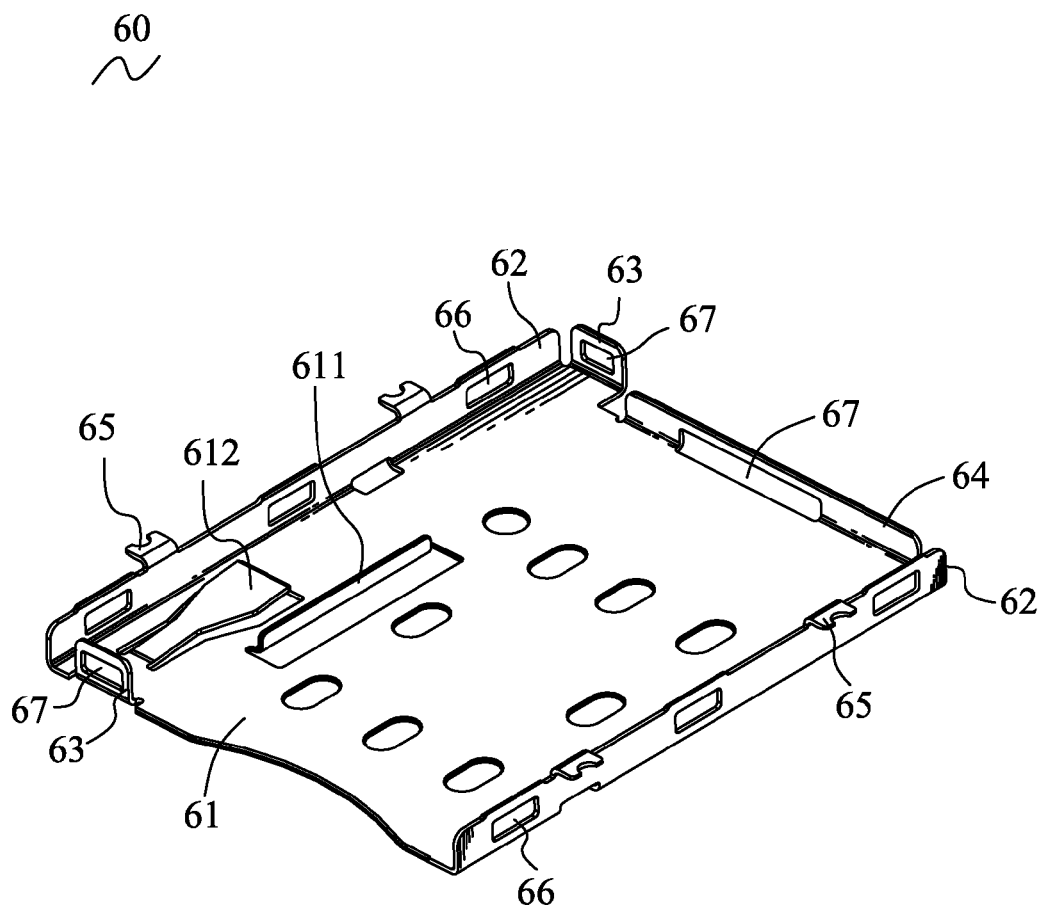
FIG. 4 is a perspective view of a shielding shell of the card connector of FIG. 2.

Referring to FIG. 2 and FIG. 4, the shielding shell 60 has a rectangular top plate 61, and two lateral plates 62 bending downward from two opposite sides of the top plate 61. Two opposite sides of a front end and a rear end of the top plate 61 extend downward to form two opposite fastening pieces 63. The other side of the rear end of the top plate 61 extends downward to form a blocking plate 64. One side of the top plate 61 of the shielding shell 60 is punched downward to form an insertion piece 611. And the one side of the top plate 61 of the shielding shell 60 is punched downward to form a pressing piece 612 located between the insertion piece 611 and one lateral plate 62 adjacent to the two fastening pieces 63. Two opposite ends of a bottom edge of each lateral plate 62 of the shielding shell 60 are bent outward to form two soldering pieces 65. Each lateral plate 62 defines a plurality of first buckling holes 66. Each of the fastening pieces 63 and the blocking plate 64 define a second buckling hole 67.

Referring to FIGS. 1-6, the conductive terminals 20 are integrally molded with the insulating housing 10 with the locating arms 21 defined at middles thereof being molded in the bottom wall 11 of the insulating housing 10, the contact arms 22 defined at fronts thereof being exposed out from the first terminal holes 111 to project beyond the top surface of the bottom wall 11 to electrically contact with the card 200, and the soldering arms 23 defined at rears thereof projecting behind a rear surface of the bottom wall 11 and soldered with the circuit board. The first switch terminal 31 and the second switch terminal 32 both are integrally molded with the insulating housing 10. Specifically, the first locating portion 311 and the first connecting portion 313 of the first switch terminal 31, and the second locating portion 321 and the second connecting portion 323 of the second switch terminal 32 are molded in the bottom wall 11 of the insulating housing 10. The first contact portion 312 of the first switch terminal 31 is exposed beyond the top surface of the bottom wall 11 of the insulating housing 10 through the second terminal hole 112 to contact with the card 200, and the second contact portion 322 of the second switch terminal 32 is exposed beyond the top surface of the bottom wall 11 of the insulating housing 10 through the second terminal hole 112 to be located under the first contact portion 312 so as to make the first contact portion 312 contact with or apart away from the second contact portion 322. The first soldering portion 314 of the first switch terminal 31 and the second soldering portion 324 of the second switch terminal 32 are exposed behind the rear surface of the bottom wall 11 and soldered with the circuit board. The soldering arms 23 of the conductive terminals 20 are in alignment with and flush with the first soldering portion 314 of the first switch terminal 31 and the second soldering portion 324 of the second switch terminal 32.

Then the ejection mechanism 40 is slidably disposed in the one side of the insulating housing 10 adjacent to the second side wall 13. The sliding block 41 is slidably disposed to the sliding groove 113 with the base body 411, the pushing portion 413 and a rear of the extending portion 414 being slidably located in the sliding groove 113, and the sliding portion 412 projecting on the top surface of the bottom wall 11 for ejecting the card 200 out. A front of the extending portion 414 projects beyond the outer surface of the front wall 14. The location pillar 416 faces to the holding pillar 151. The guiding block 415 is slidably located in the guiding slot 115 to guide the movement of the sliding block 41. The elastic element 42 is received in the receiving trough 114. One end of the elastic element 42 is worn around the holding pillar 151 and against the front surface of the rear wall 15, and the other end of the elastic element 42 is worn around the location pillar 416 and against the rear surface of the pushing portion 413 so that the elastic element 42 is restrained between the pushing portion 413 of the sliding block 41 and the corresponding rear wall 15 of the insulating housing 10. The guiding pillar 419 and the corresponding side surface of the extending portion 414 face to the protruding block 16. The fastening portion 431 of the guide pin 43 is fastened in the fastening hole 418 of the sliding block 41 and the sliding portion 432 of the guide pin 43 is slidably located in the tracking groove 161 of the insulating housing 10.

The handle lever 50 is slidably disposed to the insulating housing 10 and the sliding block 40. The first sliding rail 52 is slidably disposed to the other side of the insulating housing 10 adjacent to the first side wall 12. The second sliding rail 53 is slidably mounted to the extending portion 414 of the sliding block 41. Specifically, the first sliding rail 52 is slidably disposed in the receiving groove 121 with an inner surface thereof being flush with the inner surface of the first side wall 12 and the limiting block 56 being slidably located in the limiting slot 122 to be limited between a front inner sidewall and a rear inner sidewall of the limiting slot 122, and the second sliding rail 53 is slidably attached to the other side surface of the extending portion 414 with the guiding pillar 419 of the extending portion 414 relatively sliding in the sliding slot 57.

The shielding shell 60 is covered on the insulating housing 10 to form an insertion space 70 between the insulating housing 10 and the shielding shell 60 for receiving the card 200 therein. The card 200 is capable of being locked in or being ejected out of the insertion space 70 of the card connector 100 by virtue of pushing the handle lever 50 rearward to push the sliding block 41 to slide rearward so as to drive an action of the ejection mechanism 40. The front of the extending portion 414 projects out of the insertion space 70. The pressing piece 612 presses on the guide pin 43 for restraining the guide pin 43 to steadily slide in the tracking groove 161 of the protruding block 16. The insertion slot 401 communicates with the insertion space 70. The insertion piece 611 is slidably inserted in the insertion slot 401. The lateral plates 62 are respectively attached to the first side wall 12 and the second side wall 13 with the first buckling lumps 17 being buckled in the first buckling holes 66. The fastening pieces 63 and the blocking plate 64 are respectively attached to the front wall 14 and the rear wall 15 with the second buckling lumps 18 being buckled in the second buckling holes 67. So that the shielding shell 60 is fastened to the insulating housing 10 firmly. The soldering arms 23 of the conductive terminals 20, the first soldering portion 314 of the first switch terminal 31 and the second soldering portion 324 of the second switch terminal 32 are soldered with the circuit board. The soldering pieces 65 of the shielding shell 60 are soldered with the circuit board.

Referring to FIGS. 1-7, when the card 200 is to be inserted into the insertion space 70 of the card connector 100, the base board 51 of the handle lever 50 is pulled forward to drive the first sliding rail 52 to slide forward along an inner sidewall of the receiving groove 121 under the limitation of the limiting block 56 and the limiting slot 122, and drive the second sliding rail 53 to slide forward along the other side surface of the extending portion 414 on which the guiding pillar 419 is protruded under the guidance of the guiding pillar 419 and the sliding slot 57 so as to make the base board 51 keep a distance from a front end of the insertion space 70. The card 200 is inserted rearward into the insertion space 70 through the receiving space 54 of the handle lever 50, and then the base board 51 is pushed rearward to drive the first sliding rail 52 to slide rearward along the inner sidewall of the receiving groove 121 under the limitation of the limiting block 56 and the limiting slot 122, and drive the second sliding rail 53 to slide rearward along the other side surface of the extending portion 414 on which the guiding pillar 419 is protruded under the guidance of the guiding pillar 419 and the sliding slot 57 so as to make the base board 51 push the card 200 to move rearward into the insertion space 70 until the rear surface of the base board 51 abuts against the front surface of extending portion 414 and the rear surface of the second sliding rail 53 abuts against the front surface of the base body 411.

The base board 51 is kept on being pushed rearward to make the base board 51 push the card 200 and the extending portion 414 of the sliding block 41 and the second sliding rail 53 push the base body 411 of the sliding block 41 to move rearward so as to drive the sliding block 41 to slide rearward in the sliding groove 113 by virtue of the guidance of the guiding block 415 and the guiding slot 115 for making the sliding block 41 straightly move rearward to compress the elastic element 42 to generate an elastic potential energy. The insertion piece 611 generates a relative movement in the insertion slot 401 with respect to sliding block 41. The pressing piece 612 presses on the guide pin 43 to make the sliding portion 432 of the guide pin 43 steadily slide in the tracking groove 161 until the sliding portion 432 is locked in the locking portion 162. So the card 200 is locked in the insertion space 70 of the card connector 100. At the moment, the card 200 is inserted in place. The contact arms 22 of the conductive terminals 20 contact with metal pieces (not shown) of the card 200 to realize an electrical connection between the card 200 and the card connector 100 so that the card 200 electrically connects with the circuit board by the card connector 100. The card 200 presses down on a top of the first contact portion 312 of the first switch terminal 31 to make a bottom of the first contact portion 312 contact with the top of the second contact portion 322 of the second switch terminal 32.

When the card 200 needs to be withdrawn from the card connector 100, the base board 51 of the handle lever 50 is pushed rearward again to make the first sliding rail 52 slide rearward along the inner sidewall of the receiving groove 121 under the limitation of the limiting block 56 and the limiting slot 122, and the second sliding rail 53 slide rearward along the other side surface of the extending portion 414 on which the guiding pillar 419 is protruded under the guidance of the guiding pillar 419 and the sliding slot 57 to push the card 200, the extending portion 414 of the sliding block 41 and the base body 411 of the sliding block 41 to move rearward again so as to drive the sliding block 41 to further slide rearward in the sliding groove 113 for making the sliding portion 432 of guide pin 43 to re-slip into the tracking groove 161. Then the elastic element 42 is released to push the sliding portion 412 forward and drive the sliding block 41 to slide forward under the guidance of the guiding block 415 and the guiding slot 115 so as to eject the card 200 out of the insertion space 70 by virtue of the sliding portion 412. At that case, the bottom of the first contact portion 312 of the first switch terminal 31 is apart away from the top of the second contact portion 322 of the second switch terminal 32. The front surface of extending portion 414 abuts against the rear surface of base board 51 and the rear surface of the second sliding rail 53 abuts against the front surface of the base body 411.

Then the base board 51 of the handle lever 50 is pulled forward again to make the first sliding rail 52 slide forward along the inner sidewall of the receiving groove 121 under the limitation of the limiting block 56 and the limiting slot 122, and the second sliding rail 53 slide forward along the other side surface of the extending portion 414 on which the guiding pillar 419 is protruded under the guidance of the guiding pillar 419 and the sliding slot 57 so that the rear surface of the base board 51 is apart away from the card 200 and the front surface of the extending portion 414, and the rear surface of the second sliding rail 53 is apart away from the front surface of the base body 411. The card 200 is drawn out of the insertion space 70 of the card connector 100 through the receiving space 54.

As described above, the card 200 is locked in or ejected out of the card connector 100 by virtue of pushing the handle lever 50 rearward to push the sliding block 41 to slide rearward to drive the action of the ejection mechanism 40 so that the card 200 is inserted into the insertion space 70 of the card connector 100 in place and the card 200 is easily ejected out of the insertion space 70 of the card connector 100, when the card 200 has a very small size. As a result, it is convenient for the card 200 to be inserted into or ejected out of the insertion space 70 of the card connector 100.

What is claimed is:

1. A card connector adapted for being communicated between a card and a circuit board of a communication device, comprising:

an insulating housing having a bottom wall, a first side wall and a second side wall extending upward from two opposite sides of the bottom wall, and a rear wall extending upward from a rear end of the bottom wall, one side of a top surface of the bottom wall adjacent to the second side wall being concaved downward to form a sliding groove;

a plurality of conductive terminals integrally molded with the insulating housing with contact arms defined at fronts thereof projecting beyond the top surface of the bottom wall to electrically contact with the card, and soldering arms defined at rears thereof projecting behind a rear surface of the bottom wall to be soldered with the circuit board;

an ejection mechanism including a sliding block slidably disposed to the sliding groove of the insulating housing, an elastic element clipped between the sliding block and the rear wall, and a guide pin of which one end is fastened in the sliding block and the other end is slidably located in a front of the one side of the insulating housing, the sliding block having a base body, a sliding portion extending sideward from a rear end of one side surface of the base body to project on the top surface of the bottom wall for ejecting the card out, and an extending portion extending forward from one side of a front surface of the base body to be slidably located in the sliding groove;

a handle lever slidably disposed to the insulating housing and the sliding block, the handle lever having a base board, and a first sliding rail and a second sliding rail extending rearward from two opposite sides of the base board, the first sliding rail being slidably disposed to the other side of the insulating housing adjacent to the first side wall, and the second sliding rail being slidably mounted to the extending portion of the sliding block; and a shielding shell covered on the insulating housing to form an insertion space between the insulating housing and the shielding shell for receiving the card therein, wherein the card is locked in or ejected out of the insertion space of the card connector by virtue of pushing the handle lever rearward to push the sliding block to slide rearward so as to drive an action of the ejection mechanism.

2. The card connector as claimed in claim 1, wherein one side surface of the extending portion of the sliding block is flush with the one side surface of the base body, and the other side surface of the extending portion protrudes outward to form a guiding pillar, a substantial middle of the second sliding rail of the handle lever defines a sliding slot extending along a front-to-rear direction, the second sliding rail is slidably attached to the other side surface of the extending portion with the guiding pillar relatively sliding in the sliding slot.

3. The card connector as claimed in claim 1, wherein an inner surface of the first side wall of the insulating housing defines a receiving groove extending along a front-to-rear direction to penetrate through a front surface of the first side wall, a top of the receiving groove passes through a top surface of the first side wall and has a rear thereof further spread outward to form a limiting slot, a rear end of an outer surface of the first sliding rail of the handle lever protrudes outward to form a limiting block, the first sliding rail is slidably disposed in the receiving groove with an inner surface thereof being flush with the inner surface of the first side wall and the limiting block being slidably disposed in the limiting slot.

4. The card connector as claimed in claim 1, wherein a receiving space is formed among the base board, the first sliding rail and the second sliding rail, the card is inserted into or drawn out of the insertion space through the receiving space.

5. The card connector as claimed in claim 1, wherein a front end of a top surface of the base board protrudes upward to form an anti-skidding rib with an anti-skidding function.

6. The card connector as claimed in claim 1, wherein a bottom sidewall of the sliding groove defines a guiding slot, a bottom surface of the base body protrudes downward to form a guiding block slidably located in the guiding slot.

7. The card connector as claimed in claim 1, wherein a portion of a front surface of the rear wall of the insulating housing protrudes forward to form a holding pillar, the sliding block has a pushing portion extending opposite to the sliding portion from a front end of the other side surface of the base body, a rear surface of the pushing portion protrudes rearward to form a location pillar, one end of the elastic element is worn around the holding pillar and against the front surface of the rear wall, and the other end of the elastic element is worn around the location pillar and against the rear surface of the pushing portion.

8. The card connector as claimed in claim 1, wherein a front of a bottom sidewall of the sliding groove of the insulating housing protrudes upward to form a protruding block, a top of the protruding block defines a heart-shaped tracking groove joined end to end with a locking portion being protruded upward from a portion of a bottom sidewall of the tracking groove, the sliding block has a pushing portion extending opposite to the sliding portion from a front end of the other side surface of the base body, the pushing portion defines a fastening groove, a bottom sidewall of the fastening groove defines a fastening hole, the guide pin has a fastening portion at the one end thereof to be fastened in the fastening hole and a sliding portion at the other end thereof to slide in the tracking groove until the sliding portion is locked in the locking portion.

9. The card connector as claimed in claim 1, wherein outer surfaces of the first side wall and the second side wall of the insulating housing protrude outward to form a plurality of first buckling lumps, outer surfaces of a front wall and the rear wall of the insulating housing protrude outward to form a plurality of second buckling lumps, the shielding shell has a top plate, and two lateral plates bending downward from two opposite sides of the top plate, two opposite sides of a front end and a rear end of the top plate extend downward to form two opposite fastening pieces, the other side of the rear end of the top plate extends downward to form a blocking plate, each lateral plate defines a plurality of first buckling holes, each of the fastening pieces and the blocking plate define a second buckling hole, the lateral plates are respectively attached to the first side wall and the second side wall with the first buckling lumps being buckled in the first buckling holes, the fastening pieces and the blocking plate are respectively attached to the front wall and the rear wall with the second buckling lumps being buckled in the second buckling holes.

10. The card connector as claimed in claim 9, wherein the sliding block defines an insertion slot passing through the one side surfaces and top surfaces of the base body and the extending portion, one side of the top plate of the shielding shell is punched downward to form an insertion piece slidably inserted in the insertion slot.

11. The card connector as claimed in claim 9, wherein one side of the top plate of the shielding shell is punched downward to form a pressing piece pressing on the guide pin.

12. The card connector as claimed in claim 9, wherein two opposite ends of a bottom edge of each lateral plate of the shielding shell are bent outward to form two soldering pieces soldered with the circuit board.

13. The card connector as claimed in claim 1, wherein the bottom wall of the insulating housing defines a plurality of first terminal holes for exposing the contact arms of the conductive terminals out therefrom, and a second terminal hole located in rear of the first terminal holes, the card connector further includes a first switch terminal and a second switch terminal both integrally molded with the insulating housing, the first switch terminal has a substantial lying U-shaped first locating portion with the mouth thereof being opened rearward, a first contact portion slantwise extending upward and rearward from one end of the first locating portion to be exposed beyond the top surface of the bottom wall through the second terminal hole to contact with the card, a first connecting portion extending rearward from the other end of the first locating portion, and a first soldering portion bent downward and then extending rearward from a rear end of the first connecting portion to be exposed behind the rear surface of the bottom wall and soldered with the circuit board, the second switch terminal has a substantial lying U-shaped second locating portion with the mouth thereof being opened rearward, and a substantial U-shaped second contact portion with the mouth thereof being opened forward, a rear end of the second contact portion is inclined upward and rearward, and one side of the second contact portion connects with one end of the second locating portion to be exposed beyond the top surface of the bottom wall through the second terminal hole and located under the first contact portion so as to make the first contact portion contact with or apart away from the second contact portion, a second connecting portion extends rearward from the other end of the second locating portion, and a second soldering portion is bent downward and then extends rearward from a rear end of the second connecting portion to be exposed behind the rear surface of the bottom wall and soldered with the circuit board.

14. The card connector as claimed in claim 13, wherein the soldering arms of the conductive terminals are in alignment with and flush with the first soldering portion of the first switch terminal and the second soldering portion of the second switch terminal.

\* \* \* \* \*